United States Patent
Romaine

(12) 
(10) Patent No.: US 6,562,178 B1
(45) Date of Patent: May 13, 2003

(54) SCRATCH-RESISTANT, SELF-LAMINATED PRINTED MATERIALS AND METHODS FOR MAKING SAME

(75) Inventor: Douglas J. Romaine, Vancouver, WA (US)

(73) Assignee: Spencer & Associates, Inc., Milwaukie, OR (US)

( * ) Notice: Subject to any disclaimer, the term of this patent is extended or adjusted under 35 U.S.C. 154(b) by 0 days.

(21) Appl. No.: 09/463,142

(22) PCT Filed: Jul. 15, 1998

(86) PCT No.: PCT/US98/15000
§ 371 (c)(1),
(2), (4) Date: Jan. 11, 2000

(87) PCT Pub. No.: WO99/03674
PCT Pub. Date: Jan. 28, 1999

Related U.S. Application Data

(60) Provisional application No. 60/052,596, filed on Jul. 15, 1997.

(51) Int. Cl.[7] .......................... B32B 5/00; B32B 27/00; B32B 31/00; B32B 31/26
(52) U.S. Cl. ............. 156/277; 156/244.16; 156/244.24; 156/309.6; 427/407.1; 428/411.1
(58) Field of Search ............................. 156/242, 244.11, 156/244.16, 244.24, 277, 309.6; 427/407.1, 411, 412, 412.3, 412.1; 428/62, 66, 71, 76, 411.1

(56) References Cited

U.S. PATENT DOCUMENTS

| | | | | |
|---|---|---|---|---|
| 4,278,483 A | * | 7/1981 | Mansolillo | .............. 156/277 X |
| 4,444,808 A | * | 4/1984 | Kikuchi et al. | |
| 4,694,302 A | * | 9/1987 | Hackleman et al. | |
| 4,863,782 A | * | 9/1989 | Wang et al. | |
| 5,296,340 A | * | 3/1994 | Tsukada et al. | |

* cited by examiner

*Primary Examiner*—Curtis Mayes
(74) *Attorney, Agent, or Firm*—Marger Johnson & McCollom, P.C.

(57) ABSTRACT

A method is provided for producing a unique printable multi-layer composite structural material, and in turn a unique scratch-resistant, self-laminated printed material. A printable multi-layer composite structural material is formed which includes a first underlying substrate capable of being transported through a printing device, a second layer formed on the first layer which is flowable when heated to at least it's melting point and being fusible below it's melting point, and a third layer formed on the second layer which is printable. The third layer is also permeable so that when the second layer is in a flowable state it permeates through and about said second layer. The printable multi-layer composite structural material is capable of forming a scratch-resistant, self-laminated printed material by (a) printing a predetermined image onto the third layer, (b) heating the second layer until it is in a flowable state and permeates through and about the third layer and about the predetermined image, and (c) fusing the flowable second layer by lowering its temperature below it's melting point thereby encapsulating said third layer and the predetermined image.

19 Claims, 1 Drawing Sheet

SCRATCH-RESISTANT, SELF-LAMINATED PRINTED MATERIALS AND METHODS FOR MAKING SAME

This application claims benefit of provisional application 60/052,596 filed Jul. 15, 1997.

BACKGROUND OF THE INVENTION

In the past few years computers and electronic imaging has created the opportunity for individuals at home and work to design colored graphics and print such images in ink jet, electrographic, wax thermal transfer, dye diffusion thermal transfer and electrophotographic printers. The print media substrate for each printing system is tailored to meet basic imaging requirements. When imaged materials are intended for outdoor exposure, additional processing steps are necessary to make images robust enough to withstand the adverse conditions associated with indoor/outdoor use. Examples of these additional process steps include laminating plastic films over the printed image, or over-printing the printed image with a clear protective covering such as varnish or the like.

Ink jet, laser and electrographic transfer papers are subject to a multiplicity of manufacturing steps and specialized transfer equipment. Even so, they still may require over laminating with plastic film because the release coating is necessarily soft to accommodate the transfer step operation.

Imaging media for digital ink jet printing is divided into three primary groups. These groups are typically differentiated based on the particular substrate employed in the printing operation, i.e., paper or film or fabric. Each substrate primary group can be further distinguished based on parameters such as its relative thickness and surface texture (ranging from glossy to matte for paper and film). The gross topography of certain surfaces such as fabric and canvas substrates, for example, add additional product distinctions.

Commercial providers of graphic media therefore must carry extensive inventories of various imaging media and laminating films to meet the range of requisite customers needs. Furthermore, most all of the above-described imaging media is very susceptible to damage from smearing, water, scratching and may be tacky to the touch. Even crosslinked vinyl films are easily scratched when wet.

Lamination of printed material is generally performed by post-laminating techniques subsequent to the formation of the subject printed material. This mode of operation is time consuming and expensive. Problems with the post-lamination process which also result include wrinkling, curl, delamination, bubbles and other defects which then requires additional printing and laminating steps to be performed.

SUMMARY OF THE INVENTION

The aforementioned problems which are present in prior art imaging media; and in methods for producing such imaging media, have been overcome by the scratch-resistant laminated printed materials of the present invention, and by the methods for producing such materials.

It is therefore an object of this invention to provide such printed materials having a robust image that is produced by a unique method which reduces overall image cost by eliminating a subsequent over laminate film step.

It is a further object of this invention to provide a unique method for producing the subject printed materials that are substantially scratch resistant.

It is a further object of this invention to provide a unique method for producing the subject printed materials that are water, oil and solvent resistant, without requiring the use of additional consumable laminating materials.

It is a further object of this invention to provide a unique method for producing the subject printed materials that can be printed in both large and small format ink jet printers.

It is a further object of this invention to provide a unique method for producing the subject printed materials which can be printed employing solvent coating systems.

It is a further object of this invention to provide a unique method for producing the subject printed materials which are bonded to foil, paper photographs and substantially all porous substrates.

It is a further object of this invention to provide a unique method for producing the subject printed materials that are capable of receiving handwritten indicia using common writing instruments.

It is a further object of this invention to provide a unique method for the subject printed materials that maintain the security of the image.

It is a further object of this invention to provide a unique method for producing the subject printed materials having various outer surface patterns and textures.

It is a further object of this invention to provide a unique method for producing the subject printed materials having a plurality of thicknesses depending on the particular end use.

It is a further object of this invention to provide a unique method for producing the subject printed materials on paper substrates with enhanced wet strength properties.

These and other objects and advantages result in a preferred method which permits the formation of an imaging media capable of accepting substantially all conventional printing techniques and yet so that it can be used either in the home or by commercial print houses in conjunction with existing printing equipment.

More specifically, a method for producing a unique scratch-resistant, self-laminated printed material is provided. The subject method comprises providing a first underlying substrate layer having at least one major surface which is capable of being transported through a printing device. Preferably, the first layer is selected from a group consisting of paper, a polymer film, and a nonwoven polymer fabric.

Next, a second layer is formed having at least one major surface. This second layer is formed on at least one of the major surfaces of the first layer. The second layer is flowable when heated to at least it's melting point and is fusible below its melting point. Preferably, the second layer comprises a thermoplastic polymer. The second layer preferably has a melting point from about 70 to 80° C.

A third layer is then formed on at least one of the major surfaces of the second layer. At least one of the major surfaces of the third layer is printable. The third layer is substantially permeable, so that when the second layer is in a flowable state, the second layer will permeate through and about the third layer.

The third layer preferably comprises a solvent-based material. Typically, the third material comprises a thermoplastic binder, an inorganic pigment, and a cationic polymer. In the case where a cationic polymer is employed, it preferably comprises a polyquartemary amine.

The thermoplastic binder generally serves as a binding resin for the inorganic pigment. The thermoplastic binder preferably is present in an amount from about 20 to 60 weight percent, more preferably from about 30 to 45 weight percent, and most preferably from about 35 to 50 weight percent, based on the total third layer weight. The thermoplastic binder is preferably a nylon multi-polymer resin. The thermoplastic binder preferably has a melting point from about 100 to 175° C., more preferably a melting point from about 105 to 170° C., and most preferably a melting point from about 110 to 165° C. Preferably, the difference in the melting point temperatures between the respective second and third layers is about 25° C., more preferably about 50° C., and most preferably about 75° C.

The material also contains a inorganic pigment which is present in an amount of from about 30 to 80 weight percent, more preferably from about 35 to 70 weight percent, and most preferably from about 30 to 60 weight percent, based on total layer weight. Moreover, the inorganic pigment has a particle size of up to about 25 microns, more preferably up to about 20 microns, and most preferably up to about 15 microns in particle size. In the most preferred case, the inorganic pigment is a mineral pigment. The mineral pigment can be metal-based particulate filler material such as a Si-based, SiO-based, Ti-based, Ca-based or Mg-based filler material. In another preferred form, the inorganic pigment is treated with a wetting agent to facilitate dispersion in the third layer.

The printable multi-layer composite structural material formed as described above is capable of having predetermined image printed onto at least one printable major surface of the third layer. Once the predetermined image is printed onto the printable multi-layer composite structural material, the second layer is heated above its melting point until it is in a flowable state. Then, the flowable second layer permeates through and about the third layer and about the predetermined image. Finally, the flowable second layer is fused by lowering its temperature below it's melting point thereby encapsulating the third layer and the predetermined image and forming the scratch-resistant, self-laminated fused printed material of the present invention.

The foregoing and other objects, features and advantages of the invention will become more readily apparent from the following detailed description of a preferred embodiment which proceeds with reference to the drawings.

DETAILED DESCRIPTION OF A PREFERRED EMBODIMENT

Figure 1:
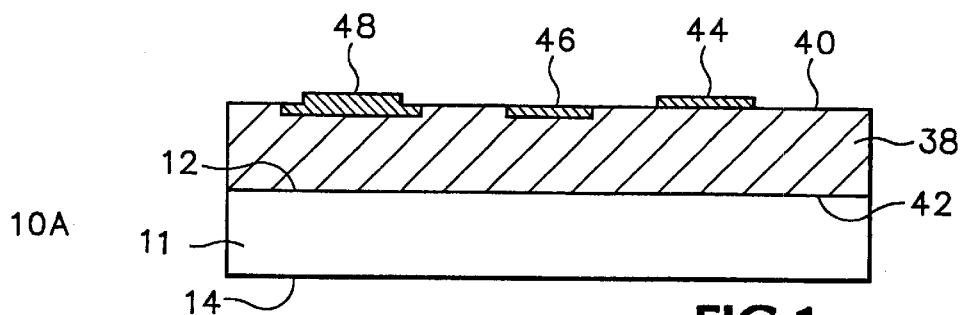
FIG. 1 is a schematic cross-sectional view of a multi-layer composite scratch-resistant, self-laminated printed material 10A of the present invention.

As depicted in FIG. 1, a scratch-resistant, self-laminated printed material 10A formed according to the teaching of the present invention, comprising a printed media construction as hereinafter described, is provided. Material 10A is formed by printing a robust predetermined image 26 onto the surface of a printable multi-layer composite structural material 10B (see FIG. 2), and then self-laminating and encapsulating the image 26 thereon.

Figure 2:
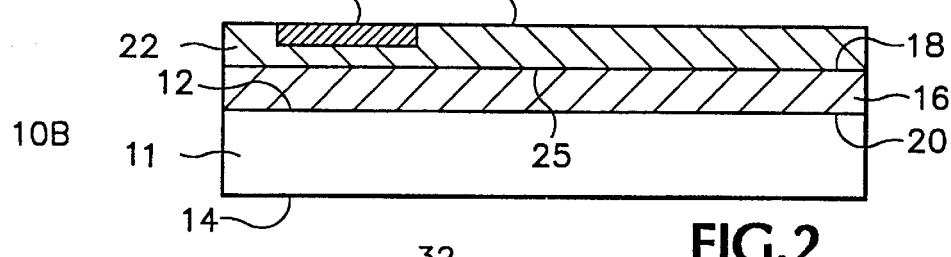
FIG. 2 is a schematic cross-sectional view of a printable multi-layer composite structural material 10B of the present invention fusible to product material 10A of FIG. 1.

Referring now to FIG. 2, material 10B comprises an underlying based substrate, such as a film, paper or plastic nonwoven sheet, which is denoted first layer 11. First layer 11 which has a top surface 12 and a bottom surface 14, has formed thereon an encapsulating fused layer, denoted second layer 16. Second layer 16, which has a top surface 18 and a bottom surface 20, surrounds a permeable printable layer, denoted third layer 22. The third layer 22 has a top surface 24 and a bottom surface 25. A robust predetermined image 26 is printed onto third layer 22. The encapsulating fused layer 16, when subjected to the requisite heat with or without pressure, forms the outer scratch-proof protective layer of material 10A for the predetermined image indicia 26, and in turn for the third layer 22.

The underlying substrates 11 of this invention are chosen by criteria defined by the properties of the finished product, such as brightness, caliper stiffness, and wet strength for papers to other porous substrates. Other materials include foil and other flexible films. The substrate 11 of the present invention is not an interactive part of the image formation process but instead serves as the underlying base structure for materials 10A and 10B. Therefore, this allows for a wide choice of substrates limited only by their being of a caliper and flexibility that will permit a given material 10B to be transported through a given printer. For example, papers such double side coated publication grades, bond copy papers, and single side coated label paper are suitable as a substrate 11. Film substrates such as opaque polyvinylidene fluoride and white polyester are also among those that are suitable for this purpose.

The second layer 16, which serves as an "encapsulating" layer for the third layer 22, typically comprises a meltable, flowable polymeric material, preferably a thermoplastic polymeric material. The second layer 16 can be applied onto substrate 11, for example, out of a water dispersion or extruded onto the top surface 12 of first layer 11. Criteria for selection of the second layer 16 is a relatively low melting point, substantially insoluble good adhesive properties, lack of color development when heated, and a melt flow index which is compatible with that of the predetermined image indicia 26, which are typically imaging inks.

Printable, permeable third layer 22 is typically applied to the second layer 18 using conventional coating methods such as a wire wound rod coater, a three roll contra coater, or a gravure coater. The third layer 22 is preferably composed of a high melting point thermoplastic binder, a mineral pigment, and a cationic polymer. Important criteria for the use of the thermoplastic binder in third layer 22 is solvent, water and petroleum resistance, and a melt temperature. The preferred criteria for the use of the mineral pigment in third layer 22 is a coating pigment particle size (as previously described), and a minimum image quality. Cationic polymer selection is primarily based on image quality.

A robust predetermined image 26 can be printed onto the surface of material 10B by a printer (not shown), for example, an ink jet printer or the like, such as an Encad Nova Jet II. For purposes of this invention, the term "robust" means that the resultant image 26 absorbed into the printable third layer 22 and has sufficient strength and sturdiness properties to pass through the printer during the printing operations described above without substantially adversely affecting the resultant image 26 without substantially displacing the top surface 24.

The graphic image encapsulating process for forming material 10B comprises typically heating the material 10A, or heating and pressing material 10B, so that the second layer 16 becomes meltable and flowable and permeates through and about permeable third layer 22 forming a fused, scratch-proof protective layer 38 for the image 26.

Figure 3:
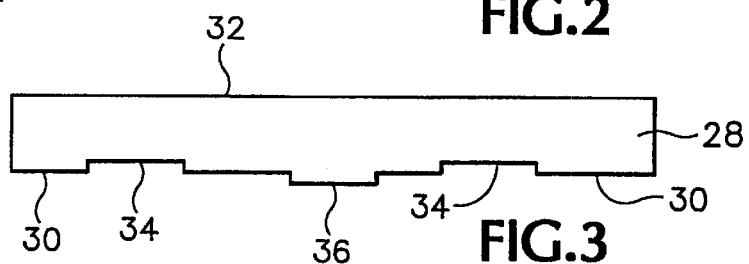
FIG. 3 is a schematic cross-sectional view of the release sheet 28.

To facilitate the graphic image encapsulating process, a silicone release sheet 28 is provided (see FIG. 3). The sheet 28 has a top surface 32 and bottom surface 30 which can have either a patterned or non-patterned configuration. As shown in FIG. 3, bottom surface 30 is patterned, including positive embossing segments 36 and negative embossing segments 34. Sheet 28 is placed over outer top surface 24 to provide an easy separation thereof from surfaces 30, 34 and 36, when removed from a heated press, such as clam shell hot press, for instance, a Seal Hot Nip Laminator Model No. IP 6000, after being cooled to room temperature. The embossed release sheet 28 is intended to produce mirror topographical molded surfaces 40, 44, 46, and 48. Sheet 28 can be textured as shown or flat with an elevation of surface 30. For example, using a glossy film, such as biaxially-oriented polypropylene (BOPP) coated with a silicone coating on surface 36 as release sheet 28, a glossy surface will result on surface 40. Glossy surface 40 can in turn be textured, by opening the press at the end of the graphic encapsulating image process, and placing embossing material 29, having upper and lower embossing surfaces 31 and 33, over the release sheet 28 for 5 to 15 second additional hot pressing. The resulting sheet will exhibit a glossy/textured surface. Common materials which can be used for embossing sheet 29 include canvas, plastic window screen, and embossed papers and films.

During the graphic encapsulating image process, the surface of fused layer 38 has properties of a hot melt adhesive which allows for a number of unique properties that are usually not found with prior art. Metal foils, paper, paper board, leather, and glass can be bonded to heated surface 40. Other bondable materials include natural products such as dried botanical specimens. Bonding the above materials to surface 38 can be accomplished by placing them between top surfaces 24 and 32 during the-graphic encapsulating image process. In another simple approach, a heated metal object, such as a hand iron, will complete the graphic encapsulating image process. This method is suitable for small format craft use, but lacks the uniformity of a commercial hot press.

Other methods of conducting the graphic encapsulating image process include either (I) by heating material 10B in an oven, for instance at temperature of about 160° C. for about two minutes, with surface 14 not touching the hot surface, or, (II) by slowly transporting roll media with surface 14 over a heated bar. Both of these methods will produce a robust matte surface 40.

For example, in a conventional coating process, a 89 g/m2 publication grade paper is coated with a clay dispersion on each of its outer surfaces. The substrate 11 is coated on surface 12 with about a 0.75 mil thickness dry clay layer using a 25% water dispersion in ethylene acrylic acid (Primacor__5980, produced by Dow Plastics) using a #40 wire wound rod. Prior art processes depend to a great extent upon water-based coating materials to adsorb water associated with ink jet printing. As a result, contact with water will degrade image quality of the printed product unless the sheet material is substantially post laminated with a protective film.

In a preferred method of the present invention, the preferred 3rd layer comprises an alcohol soluble binder resin (Elvamide__8063, a nylon multipolymer manufactured by du Pont Engineering Polymers) a coating pigment (Silcron G-130, manufactured by SCM Chemicals) which is a treated clay pigment with a mean particle size of about 3 microns and a cationic polymer (Agefloc A-50HV manufactured by CPS Chemical Co.), which is a polyquatemary amine.

The above materials were evaluated using the subject graphic image encapsulating process in an Encad Nova Jet II__color ink jet printer. The mixture formulations using the graphic image encapsulating process of the present invention and expressed in percent solids content of materials totaling one hundred percent. For example, a product was formulated for the Encad Wide Format Printer using the following range percentage levels: Binder 8963 (50% to 30%) Pigment G-130 (80% to 50%) Cationic A-50HV (10% to 0%) All coatings were prepared at 13% total non volatile solids, using methyl alcohol as the solvent.

Twenty samples of varying formulation combinations of the subject scratch-resistant, self-laminated printed material 10A were produced coating with three wire wound rods (#10, #25, and #40) to vary coating weights. Experimental papers were printed in an Encad Nova Jet II using pigmented GO™ inks and tested for image quality after the graphic image encapsulating process was completed in an oven for a period of two minutes, at 160° C.

Formulation responses of the scratch-resistant, self-laminated printed materials 10A were compared to a commercial ink jet sheet (P-124 produced by Permalite Repromedia Corporation). Key image quality parameters are image density for black and primary colors, diameter dot size measured in millimeters, "feathering" or image colors running together before drying, and dry time which is the amount of time for a wet image out of the printer to dry. The data is summarized in Table 1 below.

TABLE 1

|  | Material 10A | P-124 |
|---|---|---|
| IMAGE DENSITY |  |  |
| Black | 1.40 | >1.31 |
| Cyan | 1.37 | >1.38 |
| Magenta | 1.01 | >1.02 |
| Yellow | 0.96 | >0.86 |
| DOT SIZE (mm) |  |  |
| Black | .15 | <.19 |
| Cyan | .12 | <.15 |
| Magenta | .13 | <.15 |
| Yellow | .13 | <.14 |
| FEATHERING 0 = Poor 5 = Good |  |  |
| Black-White | 5 | 5 |
| Black-Color | 5 | 2 |
| Color-White | 5 | 5 |
| Color-Color | 4 | 0 |
| DRY TIME 0 = Poor 5 = Good |  |  |
| Black | 5.0 | 4.5 |
| Primary Colors | 4.5 | 4.5 |
| Secondary Colors | 2.5 | 0 |

As can be seen from the results for the key quality parameters, most all results for the scratch-resistant, self-laminated printed material of the present invention meet or exceed the P-124 commercial ink jet paper. The Material 10A exhibited all of the objects and advantages previously mentioned above.

Figure 4:
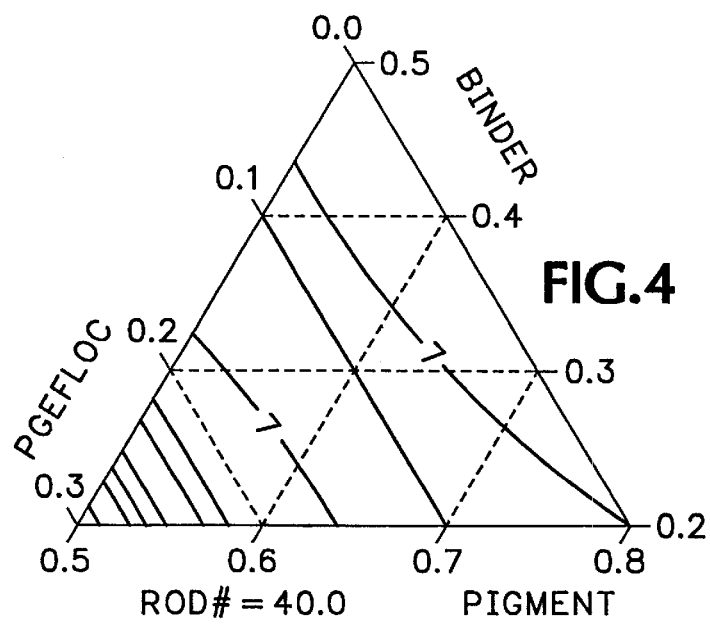
FIG. 4 is a ternary diagram which shows the optimized proportional amounts in a preferred formulation for each component of a third layer comprising an inorganic pigment, a cationic polymer and a thermoplastic binder.
Figure 5:
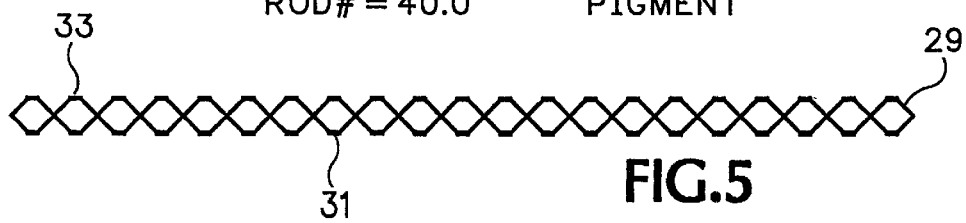
FIG. 5 is a schematic cross-sectional view of embossing material 29.

Based on the results regarding the method of present invention, which was conducted employing fusing of a printable multi-layer composite structural material 10B in an oven, the optimum weight % formulation and coating weight, based on the ternary diagram denoted FIG. 4, is as follows:

| | |
|---|---|
| Silcron G-130 inorganic pigment | 50% |
| Elvamide 8963 thermoplastic binder | 40% |
| Agefloc A-50hv cationic polymer | 10% |
| Coating Weight #40 rod | 18 g/m2 |

Having described and illustrated the principles the invention in a preferred embodiment thereof, it should be apparent that the invention can be modified in arrangement and detail without departing from such principles. We claim all modifications and variations coming within the spirit and scope of the following claims.

What is claimed is:

1. A method for producing a scratch-resistant, self-laminated printed material, which comprises
    providing a first underlying substrate layer which is capable of being transported through a printing device comprising an ink jet printer;
    forming a second layer on said first layer, said second layer being flowable when heated to at least its melting point and being fusible below it's melting point;
    forming a third layer on said second layer, said third layer being printable and permeable so that when said second layer is in a flowable state it will permeate through and about said third layer;
    printing a predetermined image onto said third layer;
    heating said second layer above its melting point until it is in a flowable state, said flowable second layer permeating through and about said third layer and about said predetermined image; and
    fusing said flowable second layer by lowering its temperature below its melting point thereby encapsulating said third layer and said predetermined image and forming said scratch-resistant, self-laminated fused printed material to produce a multi-layer composite material which can be printed in an ink jet printer.

2. The method of claim 1, in which said second layer comprises a thermoplastic polymer.

3. The method of claim 1, wherein said third layer comprises a thermoplastic binder, an inorganic pigment, and a cationic polymer.

4. The method of claim 3, wherein said thermoplastic binder is from about 20 to 60 percent of total layer weight.

5. The method of claim 3, wherein said thermoplastic binder is a nylon multipolymer resin.

6. The method of claim 3, wherein said cationic polymer comprises a polyquartemary amine.

7. The method of claim 3, wherein the inorganic pigment is a metal-based particulate filter material.

8. The method of claim 1, wherein said third layer includes an inorganic pigment in an amount of between about 30 to 80 percent based on total third layer weight.

9. The method of claim 8, wherein said inorganic pigment has a particle size of up to about 25 microns in particle size.

10. The method of claim 8, wherein said inorganic pigment is a mineral pigment.

11. The method of claim 8, wherein said inorganic pigment is treated with a wetting agent to facilitate dispersion in said third layer.

12. The method of claim 1, wherein the first layer is selected from a group consisting of paper, a polymer film, and a nonwoven polymer fabric.

13. The method of claim 1, in which said second layer has a melting point from about 70 to 80° C.

14. The method of claim 1, wherein said third layer contains a thermoplastic binder that have a melting point from about 105 to 165° C.

15. The method of claim 1, wherein said third layer is formed of a solvent-based material.

16. The method of claim 15, wherein the solvent is an alcohol.

17. The method of claim 1, wherein the difference in the melting point temperatures between the respective second and third layers is about 25° C.

18. A method for producing a printable multi-layer composite structural material, which comprises
    providing a first underlying substrate layer which is capable of being transported through a printing device comprising an ink jet printer,
    forming a second layer, formed on said first layer, said second layer being flowable when heated to at least it's melting point and being fusible below it's melting point; and
    forming a third layer on said second layer, said third layer being printable and permeable so that when said second layer is in a flowable state it will permeate through and about said second layer;
    said printable multi-layer composite structural material being capable of forming a scratch-resistant, self-laminated printed material by employing a method comprising (a) printing a predetermined image onto said third layer, (b) heating said second layer until it is in a flowable state, said flowable second layer permeating through and about said third layer and about said predetermined image, and (c) fusing said flowable second layer by lowering its temperature below it's melting point thereby encapsulating said third layer and said robust predetermined image and forming said scratch-resistant, self-laminated printed material.

19. A printable multi-layer composite structural material, which comprises
    a first underlying substrate layer which is capable of being transported through a printing device comprising an ink jet printer,
    a second layer, formed on said first layer, said second layer being flowable when heated to at least it's melting point and being fusible below it's melting point; and
    a third layer formed said second layer, said third layer being printable and permeable so that when said second layer is in a flowable state it will permeate through and about said second layer;
    said printable multi-layer composite structural material being capable of forming a scratch-resistant, self-laminated printed material by employing a method comprising (a) printing a predetermined image onto said third layer, (b) heating said second layer until it is in a flowable state, said flowable second layer permeating through and about said third layer and about said predetermined image, and (c) fusing said flowable second layer by lowering its temperature below it's melting point thereby encapsulating said third layer and said robust predetermined image and forming said scratch-resistant, self-laminated printed material.

* * * * *

UNITED STATES PATENT AND TRADEMARK OFFICE
CERTIFICATE OF CORRECTION

PATENT NO. : 6,562,178 B1  
DATED : May 13, 2003  
INVENTOR(S) : Romaine

It is certified that error appears in the above-identified patent and that said Letters Patent is hereby corrected as shown below:

Column 7,
Line 54, "particulate filter material." should read -- particulate filler material. --.

Signed and Sealed this

Eleventh Day of May, 2004

JON W. DUDAS
*Acting Director of the United States Patent and Trademark Office*